United States Patent [19]

Gres et al.

[11] 4,451,723

[45] May 29, 1984

[54] ARC-WELDING DEVICE USED TO SECURE STUDS ON METALLIC ELEMENTS UNDERWATER

[75] Inventors: Jean-Pierre Gres, Aix-en-Provence; Jean-Pierre G. Icard, Marseille, both of France

[73] Assignee: Societe Anonyme dite: Compagnie Maritime d'Expertises S.A., France

[21] Appl. No.: 382,096

[22] Filed: May 26, 1982

[30] Foreign Application Priority Data

May 26, 1981 [FR] France ............................... 81 10677

[51] Int. Cl.³ ............................................... B23K 9/20
[52] U.S. Cl. ........................................ 219/98; 219/99; 219/72
[58] Field of Search ..................... 219/98, 99, 72, 74

[56] References Cited

U.S. PATENT DOCUMENTS 3,989,920 11/1976 Masubuchi et al. ................. 219/98

4,172,974 10/1979 Stingelin et al. ..................... 219/72

FOREIGN PATENT DOCUMENTS 2042391 9/1980 United Kingdom ................. 219/98

Primary Examiner—Bruce A. Reynolds
Assistant Examiner—Catherine M. Sigoa
Attorney, Agent, or Firm—Lewis H. Eslinger

[57] ABSTRACT

The present invention relates to an arc-welding device for securing studs on metallic elements underwater, and comprising a head containing a chamber and of which the welding bead is obtained by means of a dielectric refractory ring placed around the base of the stud, wherein an annular space is provided between the stud and the ring and neutral gas is blown into the chamber through said space, to drive the water out of the chamber and keep up therein a gaseous atmosphere to facilitate the welding of the studs; the refractory ring is produced from borosilicate glass, rich in silica.

3 Claims, 1 Drawing Figure

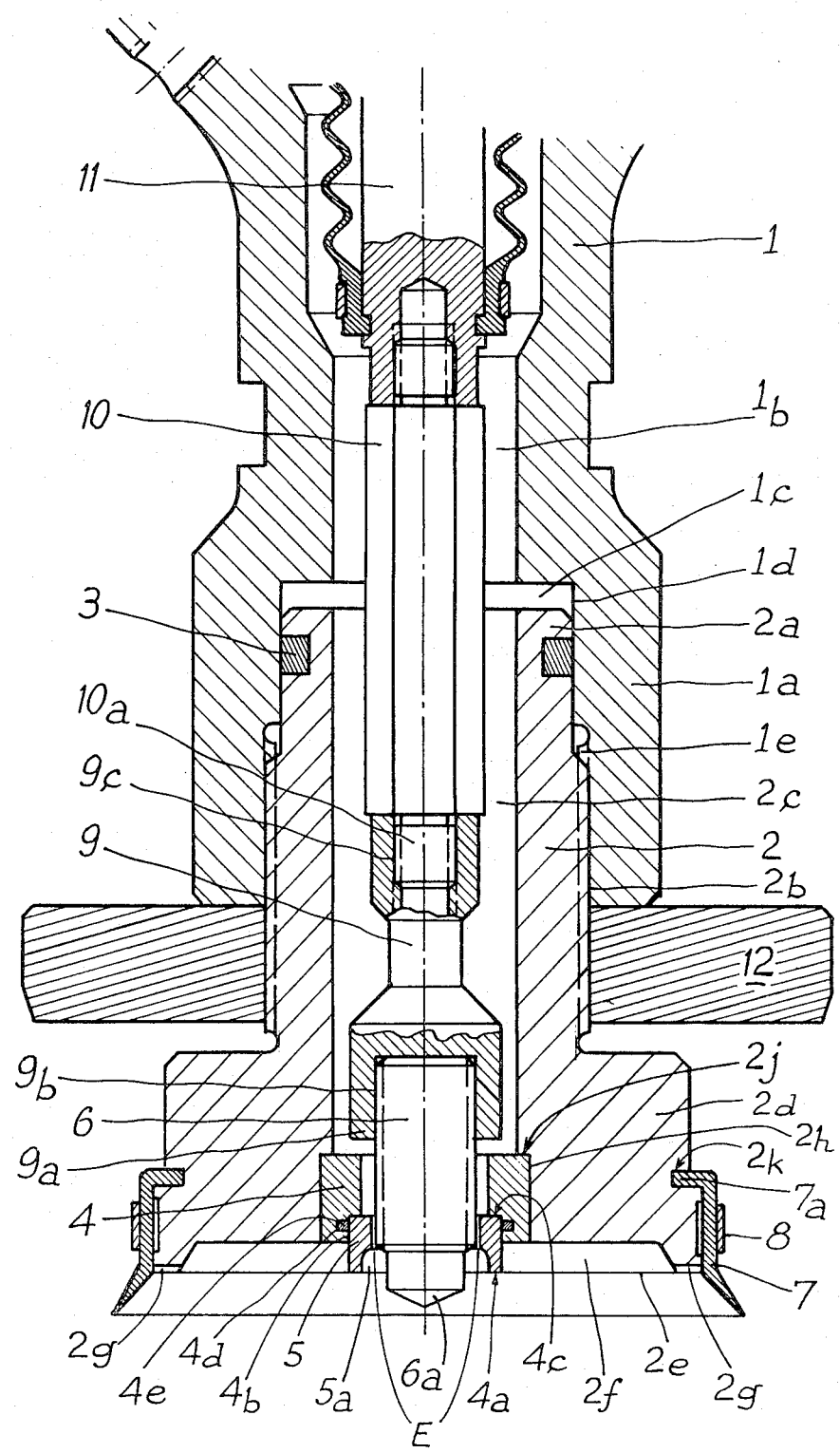

ARC-WELDING DEVICE USED TO SECURE STUDS ON METALLIC ELEMENTS UNDERWATER

The present invention relates to an arc welding device used for securing studs on metallic elements underwater.

The technical sector of the invention is that of underwater arc-welding.

An automatic arc-welding method is already known to fix many types of studs.

When welding the stud by electric arc, the entire base of said stud as well as the part of the element on which it is to be welded and which faces it, are melted in a fraction of second by the electric arc and joined together by exerting pressure on the stud with the welding device. The base of the stud, which is pointed, comprises a welding flux for the purpose of more easily priming the arc and of deoxidizing the welding bath.

A dielectric refractory ring is used to form a mold to obtain the welding bead whilst protecting the arc.

These rings, also known as ferrules, have, until now, been produced from a porous material such as for example: ceramic.

Stud-welding operations at low depths underwater have been carried out with protection being given only to the diver operating the welding device, no special protection being given around the stud, the only remedy proposed being to increase the intensity of the arc in order to be able to forcibly degas the welding area.

Such operations have proved that this method does not give really good mechanical results.

The object of the present invention is to overcome the disadvantages of the currently used techniques and is concerned with arc-welding studs underwater inside a dry chamber.

This object is reached according to the invention with an arc-welding device for welding studs on metallic elements underwater, which device comprises a head provided with a chamber of generally cylindrical shape defining a volume around the melting area of the part of the studs in contact with the said metallic elements, and of which the welding bead is obtained by means of a dielectric refractory ring placed around the base of said stud, which stud is held in a stud-holder co-axial to the chamber, said chamber being provided on its periphery with an annular bearing surface forming its base, which bearing surface comprises a plurality of radial grooves for driving out the water contained in the chamber, under the effect of a neutral gas blown therein at a pressure greater than the pressure prevailing around the device, wherein said chamber is further provided on its periphery with a supple seal forming a truncated skirt, divergent from the base of the chamber for driving out the water and thereafter keep the chamber dry throughout the welding by remaining applied on the surface of the element on which the stud is to be welded.

The chamber is provided in its center with a seat which creates an annular should against which the dielectric refractory ring rests, said seat having an inner diameter slightly greater than the external diameter of the ring and comprising a seal on its inner periphery to ensure tightness between the ring and the seat.

The dielectric refractory ring is made from a non-porous material, rich in silica. Preferably, said ring is made from borosilicate glass the composition of which will be given further on in the description.

The result of the invention is the arc-welding of studs on metallic elements underwater, which operation can be conducted at depth varying between 0 and 300 meters, the welding taking place inside a dry chamber, small in size in order to have to remove only a minimum amount of water and to keep inside the chamber only a small volume of pressurized gas, said gas being a neutral gas, preferably argon or a mixture of argon with $CO_2$, even in cases where the stud is made from a ferrous material.

The gas is chosen so as to improve the quality of the welding, considering the particular underwater conditions in which they have to be conducted.

To prevent the refractory ring from bringing foreign substances around the stud, said ring is produced from a non-porous material which is nonconducting and can withstand mechanical and thermal stresses, and to this effect a borosilicate glass, rich in silica, which is known to help weldability, has been chosen.

The present invention will be more readily understood on reading the following description, with reference to the accompanying drawing in which:

the one and only FIGURE is part of a longitudinal section showing the head of the device according to the invention for securing studs on metallic elements underwater by electrical arc welding.

The welding device which is also called stud gun is made to be water-proof in order to be used underwater.

It is composed of a casing 1 of plastic material, such as for example polyethylene, and comprises at its upper part a cylindrically-shaped head 1a.

Said casing 1 and head 1a communicate together via a conduit of circular cross-section 1b, issuing in the middle of the head 1a in a cylindrical recess 1c. The internal peripheral wall 1d of said recess is fixed on the bottom side, and is smoothed and rectified, said recess comprising on its aperture side a threading 1e which extends approximately over half the depth of the recess 1c.

In this recess 1c is engaged a cylindrical nozzle 2, which is smoothed at its end 2a so as to be able to slide closely into part 1d of the recess 1c and is threaded in its median part 2b so as to be screwed into the threading 1e provided on the inner periphery of the recess.

The nozzle 2 is provided in its center and throughout its entire length with a cylindrical conduit 2c extending the conduit 1b of the casing 1.

Said nozzle 2 also comprises at its front end a cylindrical part 2d of diameter greater than the part 2a/2b, which latter forms a circular base 2e by which the stud gun rests on the surface on which the studs are to be welded.

Said base 2e contains a cavity 2f which is preferably truncated and of small height, and constitutes a chamber of small volume defining on its periphery an annular bearing surface.

A cylindrical housing 2h co-axial to the chamber 2f and to the conduit 2c and of diameter greater than that of the latter, forms a shoulder member 2j.

The nozzle 2 is provided with a groove on the periphery of its part 2a, in which groove is fitted an O-ring 3.

Like the casing 1, the nozzle 2 is made from a plastic material such as polyethylene.

The cylindrical housing 2h is designed to receive a ring 4, preferably formed of lead, also known as ferrule-holder, which rests on the shoulder member 2j and extends over the entire length of said housing, so that its part 4a is situated inside the plane containing the bottom of the chamber 2f.

Said ferrule-holder 4 comprises, on the side of its part 4a, a cylindrical recess 4b forming a shoulder member 4c, said recess forming the seat meant to receive the refractory dielectric ring 5. Said recess 4b is provided on its periphery with a groove 4d in which is fitted an O-ring 4e to ensure tightness between the seat and the refractory ring 5.

Said ferrule-holder 4 has an inner diameter which is considerably greater than the external diameter of the studs 6.

The part 2d of the nozzle is provided on the side of the base 2e and on its periphery, with a supple seal 7 in elastomer, which seal forms a conical skirt, the wall of which is divergent from the base 2e of the nozzle 2, on the side of the surface on which the studs are to be welded.

The seal 7 comprises a "return" 7a which is engaged in a peripheral groove 2k provided on the outside of the base, said return being firmly secured in said groove by clamping means 8.

The annular bearing surface is provided with a number of radial grooves 2g, (12 for example) distributed all around the channel 2f. Said grooves are designed to allow the passage of water when the chamber is filled with gas, and if necessary to allow the passage of gas to keep the chamber dry.

The stud-gun further comprises a stud-holder 9, placed in the center of the casting 1 and extending along the longitudinal axis of the device.

Said stud-holder 9 is removably mounted at the end of an adaptor 10 which is secured to a spindle 11 which spindle is movable in longitudinal translation and connected with the electro-mechanical system of the stud-gun situated inside the casing 1.

Under the control of the gun operator, the stud-holder 9 is moved to the side of the chamber 2f when the stud is welded by the electric arc, in order to exert a pressure thereon.

A lock-nut 12 enables positioning the nozzle 2 on the casing 1.

The stud-holder 9 is provided at one end with a cylindrical head 9a comprising a blind hole 9b of inner diameter slightly greater than the external diameter of the stud, and at its other end with a threaded hole 9c permitting to screw it on the threaded portion 10a of the adapter 10.

The studs 6 which are used are the studs normally used in the technique of arc-welding and they are such as illustrated in the FIGURE, in the form of short cylindrical pins, threaded or non-threaded on their periphery, and for example comprising at their end which is meant to come into contact with the element on which they are to be welded, a conical part 6a coated with a welding flux to help priming the arc and to deoxidize the welding bath.

The dielectric refractory ring 5 has an external diameter such that it fits with a minimum of play inside the seat-forming recess 4b. Tightness between said recess and the ring 5 is ensured by O-ring 4e. Its inner diameter is greater than the external diameter of the stud 6 so as to leave between the stud and the ring an annular space E of between 0.5 and 1.5 mm.

Said refractory ring 5 adopts the shape of a torus of rectangular cross-section and can include a groove 5a on its inner periphery and at one of its ends, said groove 5a can have cross-section formed as a portion of an arc of circle, thereby constituting the mold for the welding bead during the welding operation.

Before welding, a stud 6 is introduced into the recess 9b of the stud-holder 9. Then a refractory ring 5 is inserted by engaging it in the recess 4b of the ferrule-holder 4, said ring 5 being so positioned that its groove 5a is situated on the side of the end 6a of the stud.

The stud-gun is operated to bring the annular bearing surface against the surface on which the stud 6 is to be welded.

The skirt 7 ensures the water-proofness of the chamber by being applied onto said surface.

The operator then controls the injection of neutral gas, argon for example, which gas, channeled into the conduits 1b/2c, is introduced under pressure into chamber 2f via the annular space E provided between the stud 6 and the refractory ring 5.

The pressurized argon drives the water out of the chamber 2f via the radial grooves 2g the skirt 7 being slightly raised due to the pressure of neutral gases.

The drying of the stud is helped by the circulation of gas through the annular space E.

This gas flow is kept up for a few seconds in order to dry the chamber 2f out, as well as the surface on which the stud 6 is to be welded.

As soon as the injection of gas stops, and according to one embodiment of the invention, the skirt 7 resumes its initial shape and ensures tightness between the head 2 and the surface on which the stud 6 is to be welded, and this due to its mechanical properties.

According to another embodiment of the invention, a depression is created in the chamber 2f to bring the gas pressure to a pressure less than that prevailing on the waterbed where the submerged elements to which the studs will be welded, are situated.

The pressure of the gas inside the chamber 2f therefore varies in relation to the depth of operation, which pressure can be near or equal to atmospheric pressure.

The arc-welding operation is then conducted in a gaseous atmosphere, this giving a good-quality welding.

To make the stud more easily weldable on its support, and because the welding is conducted underwater, the material constituting the refractory ring 5 has been chosen to be a glass with a high content of silica.

One advantage of glass is that it is a non-porous material, this preventing noxious elements from being brought around the stud, which could reduce the quality of the welding: as an example, and considering the ambient medium, traces of water could be absorbed by a conventional ring, typically formed of ceramic porous earth.

The refractory rings being required to withstand mechanical and thermal stresses, said rings 5 are produced from borosilicate glass composed as follows:
silica between 70 and 90% and preferably 80%
boric oxide between 0.5 and 20% and preferably 13%
alumina between 0.5 and 4% and preferably 2.25%
sodium oxide between 2 and 5% and preferably 3.5%
potassium oxide between 2 and 5% and preferably 1.15%
ferric oxide 0.05%
impurities 0.05%

The invention is in no way limited to the description given hereinabove and the parts described therein can be replaced by equivalent parts acting in the same way. In particular, the term stud which is used covers any metallic parts which can be secured by arc-welding on metallic elements, such as wedges, projections or the like.

What is claimed is:

1. Arc-welding device to attach a stud to a metallic element immersed in a liquid, comprising a head including means forming a substantially cylindrical chamber surrounding a fusion area where said stud contacts said metallic element, a stud carrier concentrically arranged in said chamber, a dielectric refractory ring arranged around one end of said stud and retained in said chamber by a ferrule holder, flexible skirt means affixed to said head at one circular edge and arranged around the periphery of said chamber, the other circular edge of said flexible skirt means tapering to a thin peripheral rim, said flexible skirt means being formed to flare outwardly to said other circular edge to a diameter greater than a diameter at said one circular edge forming a truncated cone that diverges from a base of said chamber, said thin peripheral rim being adapted to sealingly contact a surface of said metallic element for attachment of said stud thereto, means in fluid communication with said chamber to insufflate said chamber for expelling all liquid therein by causing said thin peripheral rim of said skirt to lift and for maintaining a gaseous environment favorable to welding said studs, and means for forming a depression in said chamber following said liquid being expelled therefrom, whereby the pressure in said chamber is less than the pressure outside said chamber so that said skirt is maintained in contact with said surface of said metallic element.

2. Device as claimed in claim 1, wherein said dielectric refractory ring is made from a non-porous material, rich in silica, that has been vitrified.

3. Device as claimed in claim 2, wherein said ring is made from borosilicate glass composed as follows:
silica between 70 and 90% and preferably 80%
boric oxide between 0.5 and 20% and preferably 13%
alumina between 0.5 and 4% and preferably 2.25%
sodium oxide between 2 and 5% and preferably 3.5%
potassium oxide between 2 and 5% and preferably 1.15%
ferric oxide 0.05%
impurities 0.05%.

* * * * *